United States Patent
Tsai et al.

(10) Patent No.: US 9,641,058 B2
(45) Date of Patent: May 2, 2017

(54) LINEAR MOTOR AND MOTOR SET HAVING MULTIPLE MAGNETIC YOKE PORTIONS SUPPORTING MAGNETS

(71) Applicant: DELTA ELECTRONICS, INC., Taoyuan Hsien (TW)

(72) Inventors: Ching-Hsiung Tsai, Taoyuan Hsien (TW); Hong-Cheng Sheu, Taoyuan Hsien (TW); Chi-Wen Chung, Taoyuan Hsien (TW); En-Yi Chu, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 408 days.

(21) Appl. No.: 14/162,168

(22) Filed: Jan. 23, 2014

(65) Prior Publication Data
US 2015/0180322 A1 Jun. 25, 2015

(30) Foreign Application Priority Data
Dec. 19, 2013 (TW) .............................. 102147220 A (51) Int. Cl.
*H02K 41/02* (2006.01)
*H02K 41/03* (2006.01)
(Continued)

(52) U.S. Cl.
CPC .......... *H02K 41/031* (2013.01); *H02K 16/00* (2013.01); *H02K 3/47* (2013.01); *H02K 41/02* (2013.01)

(58) Field of Classification Search
CPC .......... H02K 3/47; H02K 16/00; H02K 41/02; H02K 41/031
(Continued)

(56) References Cited

U.S. PATENT DOCUMENTS 3,913,045 A * 10/1975 Von Starck ............ H02K 44/06
310/11
4,151,447 A * 4/1979 von der Heide ..... H02K 41/031
104/290
(Continued)

FOREIGN PATENT DOCUMENTS

JP 2000-92812 3/2000
JP 2000078830 A 3/2000
(Continued)

OTHER PUBLICATIONS

Ito et al., English Translation of JP 2008118746 A, May 2008.*
Miyamoto et al., English Translation of JP 2005278280 A, Oct. 2005.*

*Primary Examiner* — Joshua Benitez-Rosario
*Assistant Examiner* — Rashad Johnson
(74) *Attorney, Agent, or Firm* — Kirton McConkie; Evan R. Witt (57) ABSTRACT

A linear motor includes a case, a magnet assembly and a coil assembly. The case is disposed along a first direction. The magnet assembly includes at least two first magnets, among which the first magnets are disposed corresponding to and between two first magnetic yokes, respectively. The coil assembly includes a winding coil having an exposed portion, among which the exposed portion is extended along a second direction and disposed between the two first magnetic yokes, and the exposed portion is at least partially overlapped with the two first magnets in a third direction. As a result, the coil assembly and the case are driven to reciprocate along the first direction by the winding coil due to the magnetic force, thereby solving the magnetic disturbing issue, enhancing the driving force of the linear motor, and optimizing the mechanical rigidity.

10 Claims, 8 Drawing Sheets (51) Int. Cl.
*H02K 16/00* (2006.01)
*H02K 3/47* (2006.01)

(58) Field of Classification Search
USPC ............ 310/12.09, 12.21, 13, 14, 15, 25, 26
See application file for complete search history.

(56) References Cited

U.S. PATENT DOCUMENTS

| | | | | | |
|---|---|---|---|---|---|
| 4,767,954 | A | * | 8/1988 | Phillips | H02K 41/031 310/12.21 |
| 5,087,844 | A | * | 2/1992 | Takedomi | H02K 41/031 310/12.01 |
| 5,783,877 | A | * | 7/1998 | Chitayat | H02K 9/005 310/12.02 |
| 6,064,128 | A | * | 5/2000 | Yagoto | H02K 41/03 310/12.04 |
| 6,140,734 | A | * | 10/2000 | Hazelton | H02K 3/04 310/12.21 |
| 6,664,665 | B2 | * | 12/2003 | Hsiao | H02K 41/03 310/12.14 |
| 7,232,689 | B2 | * | 6/2007 | Pawliszyn | A61B 5/417 422/119 |
| 7,531,923 | B2 | * | 5/2009 | Shikayama | H02K 41/031 310/12.21 |
| 8,232,689 | B2 | * | 7/2012 | Denne | H02K 3/26 310/12.21 |
| 2003/0141768 | A1 | * | 7/2003 | Kim | H02K 41/03 310/12.15 |
| 2004/0032170 | A1 | * | 2/2004 | Tamai | H02K 41/03 310/13 |
| 2006/0108879 | A1 | * | 5/2006 | Sugita | H02K 41/03 310/12.15 |
| 2007/0152513 | A1 | * | 7/2007 | Shikayama | H02K 41/03 310/12.23 |
| 2011/0052348 | A1 | * | 3/2011 | Hanamura | H02K 16/00 414/225.01 |
| 2011/0227423 | A1 | * | 9/2011 | Hsu | H02K 41/03 310/12.22 |
| 2014/0175910 | A1 | * | 6/2014 | Hanamura | H02K 16/00 310/12.15 |

FOREIGN PATENT DOCUMENTS

| | | | |
|---|---|---|---|
| JP | 2002-171742 A | | 6/2001 |
| JP | 2001-275338 A | | 10/2001 |
| JP | 2003061329 A | | 2/2003 |
| JP | 2005-57992 | | 3/2005 |
| JP | 2005278280 A | * | 10/2005 |
| JP | 2008-57992 A | | 4/2008 |
| JP | 2008118746 A | * | 5/2008 |
| TW | I370608 | | 8/2012 |

* cited by examiner

LINEAR MOTOR AND MOTOR SET HAVING MULTIPLE MAGNETIC YOKE PORTIONS SUPPORTING MAGNETS

TECHNICAL FIELD

The present disclosure relates to a linear motor, and more particularly to a linear motor having independent and closed magnetic field that can be combined for different applications and the motor set using the same.

BACKGROUND

In the field of industrial manufacturing and automatic control, a server motor and a ball screw are used to drive and control the position of straight-line motions in conventional. Since the growing and competition of main application fields, such as semiconductor industry, electronic industry, photoelectric industry, medical apparatus and automatic control, are fast and intense, the requirements of the linear motion performances of the motors arise day by day. The motors are required to have high speed, low noise and high positioning accuracy. Under this circumstance, the conventional server motors and the mechanical motions are replaced by the linear motors in many applications.

In general, although the conventional linear motors of the motor set can be independently operated, it is still hard to minimize the mechanism size, increase the driving force and make the magnetic fields independent with each other in the same time. On the other hand, the conventional linear motors has to be integrated with a sliding guide and a sensing unit, and an extra requirement of spaces will exist when the integration is not perfect or when other demands has to be met.

Figure 1A:
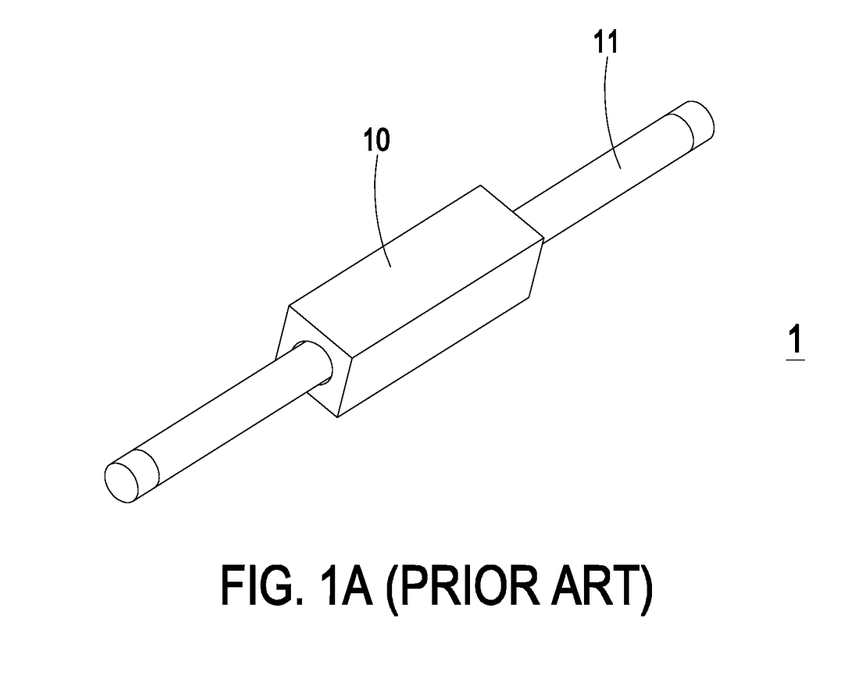
FIG. 1A schematically illustrates the structure of a conventional linear motor.

Please refer to FIG. 1A. FIG. 1A schematically illustrates the structure of a conventional linear motor. As shown in FIG. 1A, the conventional linear motor 1 includes a case 10 and an axial portion 11, the winding used by the conventional linear motor 1 is wound around the axial portion 11 and disposed inside the case 10. Because the winding is circle-shaped or ring-shaped, the total length of the conventional linear motor 1 has to be increased when the driving force of the motor is required to be enhanced due to the limitations of the height or the width of the conventional linear motor 1. However, when the ratio of length to width of the conventional linear motor 1 becomes too much larger, the mechanical rigidity becomes worse and the machining becomes more difficult, and even processing issues will occur during winding and adhesion.

Figure 1B:
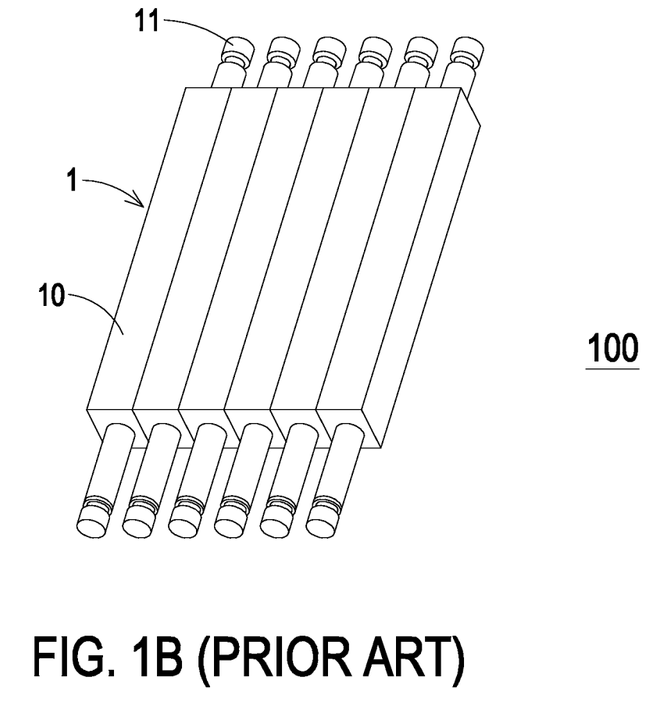
FIG. 1B schematically illustrates the structure of a motor set using the conventional linear motor.

Please refer to FIG. 1B. FIG. 1B schematically illustrates the structure of a motor set using the conventional linear motor. As shown in FIG. 1B, a plurality of the conventional linear motor 1 are applied to a motor set 100. Except for the drawbacks mentioned above, a disturbing issue usually happens because of the open magnetic fields of the conventional linear motors 1 of the motor set 100. In other words, the magnetic fields of the conventional linear motors 1 disturb each other. Meanwhile, the cases 10 of the conventional motors 1 are closely connected, so that the surface temperature of the covers 10 will be too high to disable the sensing unit connected with the motor set 100.

There is a need of providing a linear motor and a motor set using the same to obviate the drawbacks encountered from the prior art.

BRIEF SUMMARY

The present disclosure provides a linear motor and a motor set using the same in order to eliminate the drawbacks of the extra requirement of spaces, the difficulty of machining and enhancing the driving force, the worse mechanical rigidity and the processing issues of winding and adhesion, and further to avoid the disturbances between the open magnetic fields of conventional motors of a motor set and the non-effectivity of the sensing unit connected with the cases of the conventional motors due to the high temperature.

The present disclosure also provides a linear motor and a motor set using the same. By utilizing a winding coil with an exterior and position design and first magnetic yokes for closing the magnetic field, the magnetic disturbances between linear motors are eliminated. Moreover, via the combination of the magnets of the motor and the first magnetic yokes, the space limitation is avoided, the driving force of the linear motor is effectively enhanced without increasing the ratio of length to width, the mechanical rigidity is optimized, and the process of manufacturing and the difficulty of machining are simplified.

In accordance with an aspect of the present disclosure, there is provided a linear motor. The linear motor includes a case, a magnet assembly and a coil assembly. The case is disposed along a first direction. The magnet assembly includes at least two first magnets, among which the first magnets are disposed corresponding to and between two first magnetic yokes, respectively. The coil assembly includes a winding coil having an exposed portion, among which the exposed portion is extended along a second direction and disposed between the two first magnetic yokes, and the exposed portion is at least partially overlapped with the two first magnets in a third direction. As a result, the coil assembly and the case are driven to reciprocate along the first direction by the winding coil due to the magnetic force.

In accordance with another aspect of the present disclosure, there is provided a motor set. The motor set includes a plurality of first magnetic yokes, a plurality of linear motors and two second magnetic yokes. Each of the linear motors is partially disposed between two adjacent first magnetic yokes of the first magnetic yokes, and each of the linear motors includes a case, a magnet assembly and a coil assembly. The case is disposed along a first direction. The magnet assembly includes at least two first magnets, among which the first magnets are disposed corresponding to and between the two adjacent first magnetic yokes, respectively. The coil assembly includes a winding coil, among which the winding coil has an exposed portion. The two second magnetic yokes are disposed on two opposite sides of the first magnetic yokes and connected with two first magnetic yokes disposed on the two opposite sides of the first magnetic yokes, respectively. The exposed portion of the winding coil of the coil assembly is extended along a second direction and at least partially disposed between the two adjacent first magnetic yokes, and the exposed portion is at least partially overlapped with the first magnets in a third direction, such that the coil assembly and the case are driven to reciprocate along the first direction by the winding coil due to the magnetic force.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 2:
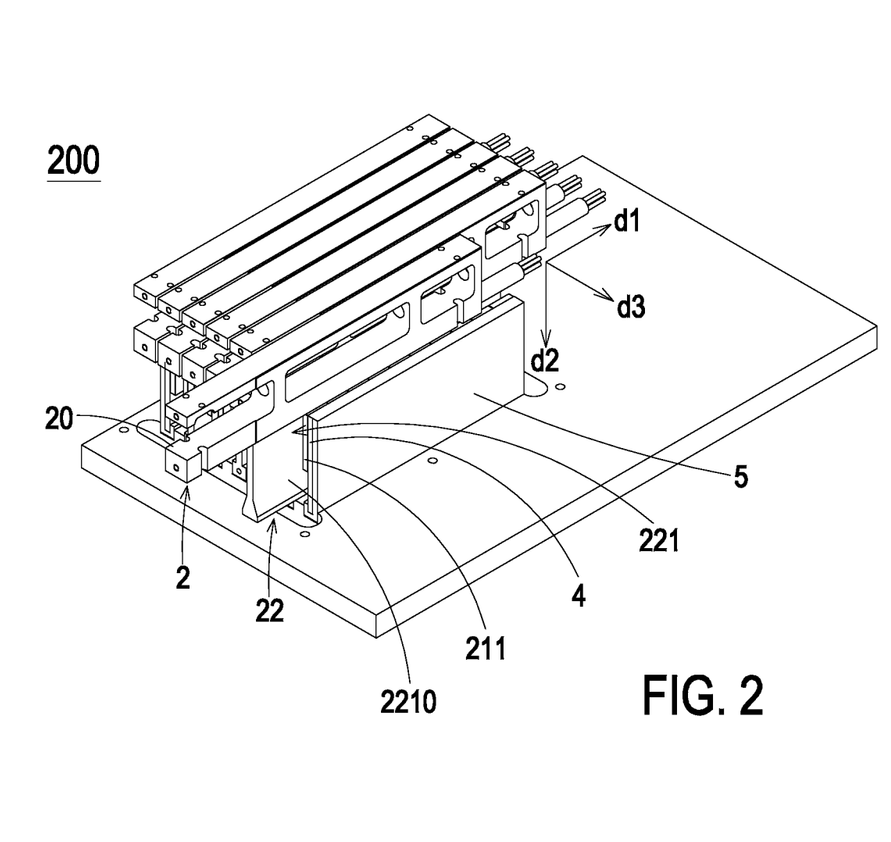
FIG. 2 schematically illustrates the structure of a linear motor and the motor set using the same according to an embodiment of the present disclosure.
Figure 3:
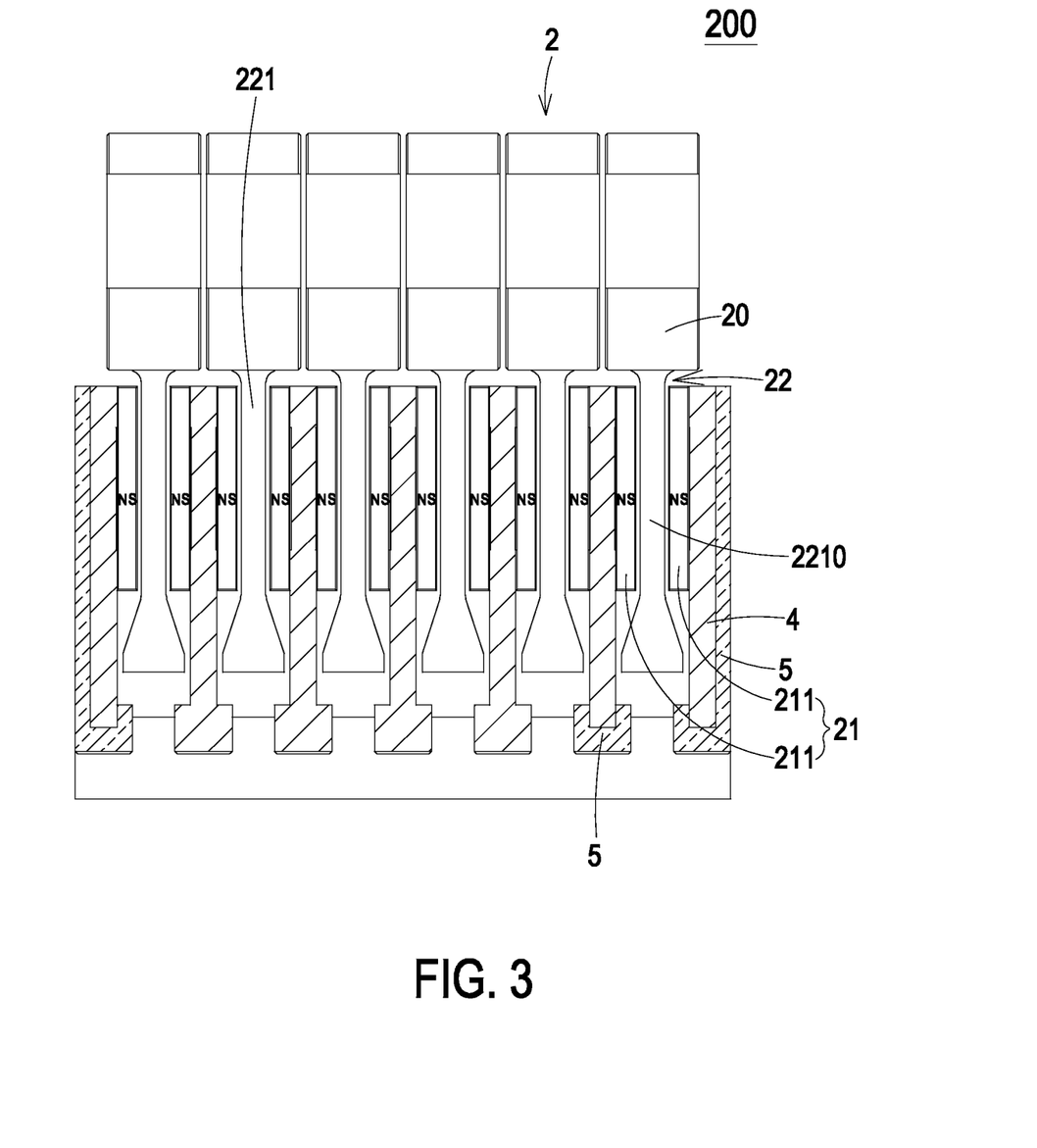
FIG. 3 schematically illustrates the side view of a linear motor and a motor set using the same according to an embodiment of the present disclosure.

Please refer to FIG. 2 and FIG. 3. FIG. 2 schematically illustrates the structure of a linear motor and the motor set using the same according to an embodiment of the present disclosure. FIG. 3 schematically illustrates the side view of a linear motor and a motor set using the same according to an embodiment of the present disclosure. As shown in FIG. 2 and FIG. 3, the linear motor 2 of the present invention includes a case 20, a magnet assembly 21 and a coil assembly 22. The case 20 is disposed along a first direction d1. The magnet assembly includes at least two first magnets 211, among which the two first magnets 211 are disposed corresponding to two first magnetic yokes 4, respectively, and more particularly disposed between the two first magnetic yokes 4. The coil assembly 22 includes a winding coil 221, and the winding coil 221 has an exposed portion 2210. The exposed portion 2210 is extended along a second direction d2, extended from the case 20 and disposed between the two first magnetic yokes 4, and the exposed portion 2210 is at least partially overlapped with the at least two first magnets 211 in a third direction d3, such that the coil assembly 22 and the case 20 are driven to reciprocate along the first direction d1 by the winding coil 221 due to the magnetic force. In this embodiment, the first direction d1 is perpendicular to the second direction d2 and the third direction d3, the second direction d2 is perpendicular to the first direction d1 and the third direction d3, and any two of the first direction d1, the second direction d2 and the third direction d3 are perpendicular to each other. In other words, the first direction d1, the second direction d2 and the third direction d3 are the three axial directions of a three-dimensional space or a three-dimensional coordinate system, which are perpendicular to each other.

In some embodiments, the motor set 200 of the present invention includes a plurality of linear motors 2, a plurality of first magnetic yokes 4 and two second magnetic yokes 5, among which each of the linear motors 2 is partially disposed between two adjacent first magnetic yokes 4 of the plural first magnetic yokes 4. In particular, each linear motor 2 is disposed between every two first magnetic yokes 4, so that the total amount of the linear motors 2 is equal to the total amount of the first magnetic yokes 4 minus one. Each of the linear motors 2 includes a case 20, a magnet assembly 21 and a coil assembly 22, the case 20, the magnet assembly 21 and the coil assembly 22 are similar with the embodiment mentioned above except for that the at least two first magnets 211 of the magnet assembly 21 are disposed corresponding to two adjacent first magnetic yokes 4 and the exposed portion 2210 of the winding coil 221 of the coil assembly 22 is extended from the case 20, extended along the second direction d2, and at least partially disposed between the two adjacent first magnetic yokes 4, and are not redundantly described herein. In addition, two second magnetic yokes 5 are disposed on two opposite sides of the first magnetic yokes 4 and connected with two first magnetic yokes 4, which are disposed on the two opposite sides of the plural magnetic yokes 4, respectively, for auxiliary positioning the first magnetic yokes 4. Under this circumstance, the disturbances between linear motors 2 are eliminated by the linear motor 2 and the motor set 200 using the same of the present invention by utilizing a winding coil 221 with an exterior and position design and first magnetic yokes 4 for closing the magnetic field. Meanwhile, the space limitation is avoided, the driving force of the linear motor is effectively enhanced without increasing the ratio of length to width (of the linear motor 2), the mechanical rigidity is optimized, and the process of manufacturing and the difficulty of machining are simplified.

Furthermore, the first magnetic yokes 4 and the second magnetic yokes 5 may be entirely or partly made of permeable materials, such as L-shaped permeable materials or counter-T-shaped permeable materials. To make the figures and the drawings simple and easy to understand and realize, parts of the first magnetic yokes 4 and the second magnetic yokes 5 are illustrated in different materials as shown in FIG. 3, but are not limited to the illustration of FIG. 3 in different embodiments.

Figure 4:
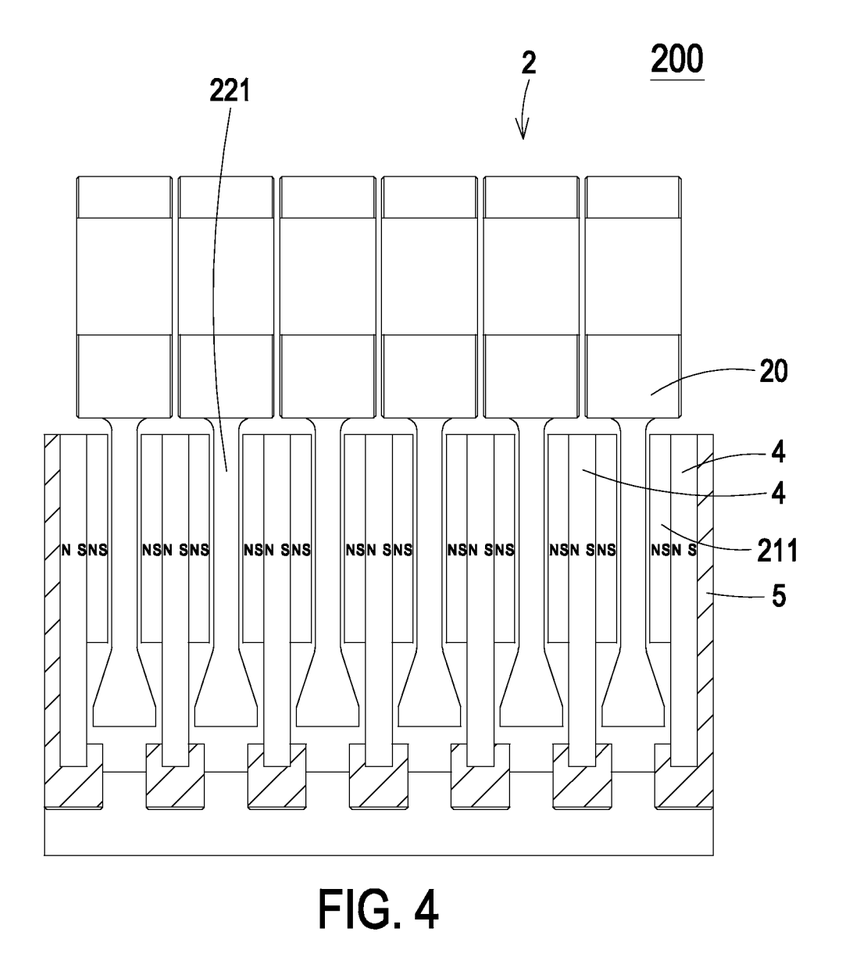
FIG. 4 schematically illustrates the side view of a linear motor and a motor set using the same according to another embodiment of the present disclosure.

Please refer to FIG. 4. FIG. 4 schematically illustrates the side view of a linear motor and a motor set using the same according to another embodiment of the present disclosure. As shown in FIG. 4, each of the first magnetic yokes 4 of the present invention may be directly a second magnet, and the first magnetic yokes 4 may be entirely or partly second magnets. In other words, each of the first magnetic yokes 4 can be not only performed as an element for the first magnets 211 to be disposed on and a supporting element of the magnet assembly 21, but also performed as a permanent magnet element, in which the design of the linear motor 2 and the motor set 200 using the same of the present invention can be varied to meet the demands of the magnetic circuit, thereby enhancing the driving force of the linear motor 2 in a limited space.

Figure 5:
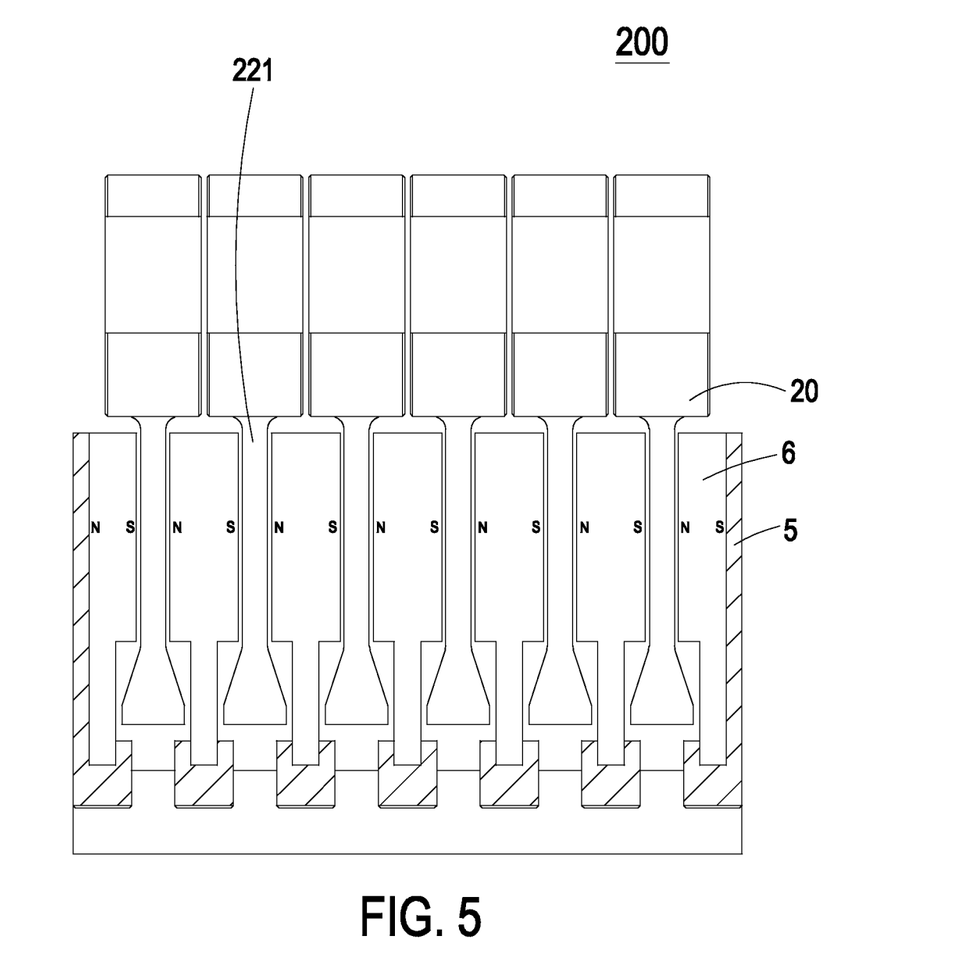
FIG. 5 schematically illustrates the side view of a linear motor and a motor set using the same according to still another embodiment of the present disclosure.

Please refer to FIGS. 4 and 5. FIG. 5 schematically illustrates the side view of a linear motor and a motor set using the same according to still another embodiment of the present disclosure. In some embodiments, each the second magnet, which is the first magnetic yoke 4, and at least one of the first magnets 211 are integrally formed and integrated as a third magnet 6. In the preferred embodiment, a second magnet and two adjacent first magnets 211 are integrally formed and integrated as the third magnet 6. The two adjacent first magnets 211 are two adjacent first magnets 211 of the magnet assemblies 21 of two adjacent linear motors 2, and the two adjacent first magnets 211 are preferably disposed on the same first magnetic yoke 4, but not limited thereto. That is to say, the first magnetic yoke 4 of the present disclosure can be not only performed as an element for the first magnets 211 to be disposed on and a supporting element of the magnet assembly 21, but also separately performed as a permanent magnet element or integrally formed and integrated with the first magnets 211 as another permanent magnet element having relatively larger magnetic force, as which the present invention teaches.

Figure 6:
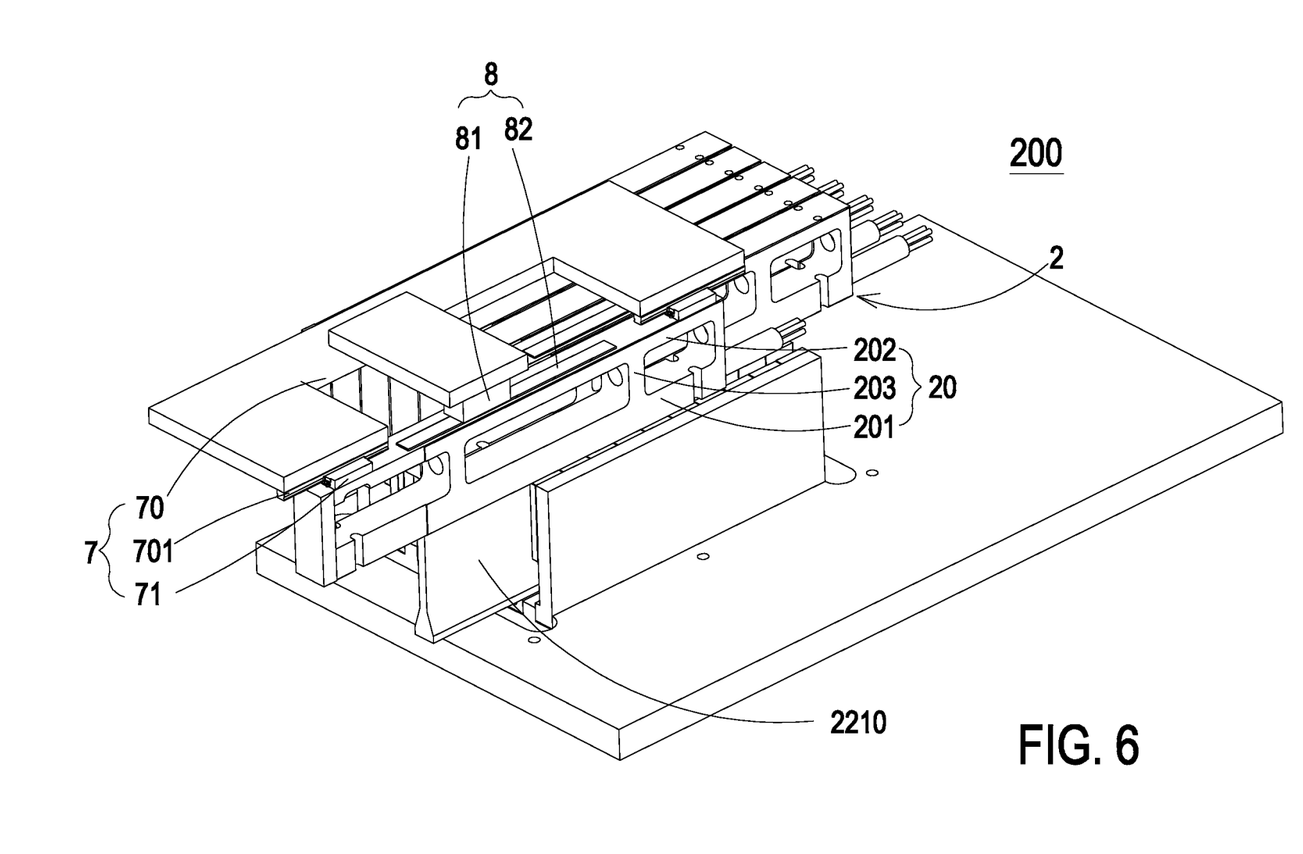
FIG. 6 schematically illustrates the structure of a motor set and a motion-guiding device and a linear position-sensing device thereof according to an embodiment of the present disclosure.
Figure 7:
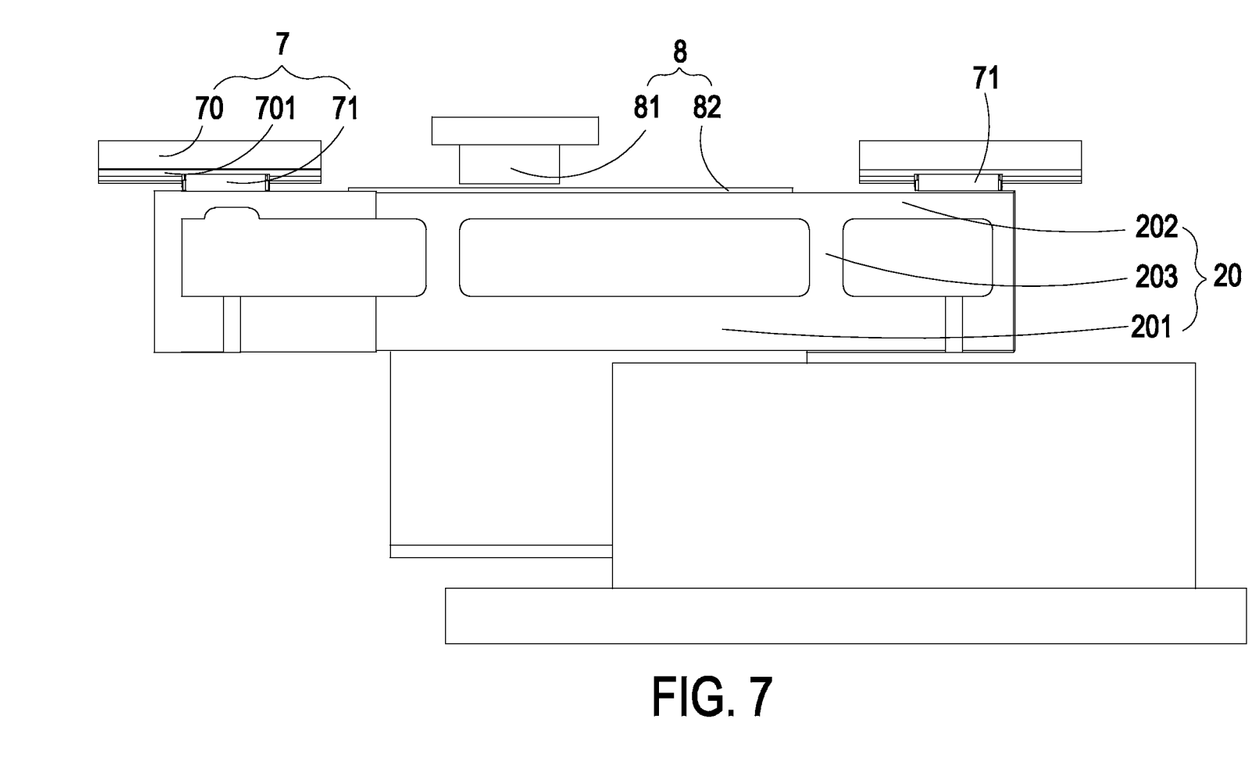
FIG. 7 schematically illustrates the partially front view of the motor set and the motion-guiding device and the linear position-sensing device thereof as shown in FIG. 6.

Please refer to FIGS. 6 and 7. FIG. 6 schematically illustrates the structure of a motor set and a motion-guiding device and a linear position-sensing device thereof according to an embodiment of the present disclosure. FIG. 7 schematically illustrates the partially front view of the motor set and the motion-guiding device and the linear position-sensing device thereof as shown in FIG. 6. As shown in FIG. 6 and FIG. 7, the case 20 of the linear motor 2 of the motor set 200 of the present invention includes a first body 201, a second body 202 and at least a connecting portion 203. The first body 201 is disposed along the first direction dl, the exposed portion 2210 of the winding coil 221 of the coil assembly 22 is extended from the first body 201, and the connecting portion 203 is connected with the first body 201 and the second body 202. In this embodiment, the amount of the connecting portion 203 is shown as 2 in the illustration. However, the practical amount of the connecting portion 203 can be adjusted and designed to meet the demands of mechanical rigidity, thermal transfer or heat dissipation, and the amount of the connecting portion 203 is preferably over than 1. In other words, the case 20 can be considered as a hollow structure since the case 20 includes the first body 201 and the second body 202 and the connecting portion 203 is connected with the first body 201 and the second body 202. Therefore, not only the total weight of the case 20 is reduced, but also the thermal transfer is reduced and the heat dissipation is enhanced for protecting the heat sensitive electronic components (e.g. the electronic components disposed on the second body 202, not shown).

In some embodiments, the motor set 200 further includes a motion-guiding device 7 disposed on the second body 202 of the case 20. The motion-guiding device 7 includes a main body 70 and at least a sliding member 71, among which the main body 70 has at least a sliding rail 701, and the sliding member 71 is connected with the main body 70 and the second body 202 of the case 20 for supporting the main body 70. In addition, the motor set 200 further includes a linear position-sensing device 8 including a sensing unit 81 and a linear scale 82. The sensing unit 81 is disposed on a fixing mechanism, and the linear scale 82 is disposed on the second body 202 of the case 20. The relative motions between the sensing unit 81 and the linear scale 82 are used to decide the position of moving part. For example, the linear scale 82 may be an optical scale or a magnetic scale, which is read by the sensing unit 81, but not limited thereto. The case 20 of the linear motor 2 of the present disclosure utilizes the specific design mentioned above, so that the case 20 is effectively integrated with the motion-guiding device 7 and the linear position-sensing device 8, and further the space is optimized.

From the above description, the present disclosure provides a linear motor and a motor set using the same. By utilizing a winding coil with an exterior and position design and first magnetic yokes for closing the magnetic field, the disturbances between linear motors are eliminated. Moreover, via the combination of the magnets of the motor and the first magnetic yokes, the space limitation is avoided, the driving force of the linear motor is effectively enhanced without increasing the ratio of length to width, the mechanical rigidity is optimized, and the process of manufacturing and the difficulty of machining are simplified.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A linear motor, comprising:
   a case disposed along a first direction;
   a magnet assembly comprising at least two first magnets, wherein the first magnets are disposed corresponding to and between two first magnetic yokes, respectively; and
   a coil assembly comprising a winding coil, wherein the winding coil has a exposed portion, the exposed portion is extended along a second direction from the case and disposed between the two first magnetic yokes, and the exposed portion is at least partially overlapped with the first magnets in a third direction, such that the coil assembly and the case are driven to reciprocate along the first direction by the winding coil due to the magnetic force;
   wherein the case comprises a first body, a second body and at least a connecting portion, wherein the first body is disposed along the first direction and the second body is parallel to the first body, the exposed portion of the winding coil of the coil assembly is extended from the first body, and the connecting portion is perpendicular to and connected with the first body and the second body, and wherein the amount of the first magnetic yokes is equal to the amount of the case plus one.

2. The linear motor according to claim 1, wherein the first direction is perpendicular to the second direction and the third direction, the second direction is perpendicular to the first direction and the third direction, and any two of the first direction, the second direction and the third direction are perpendicular to each other.

3. The linear motor according to claim 1, wherein the two first magnetic yokes are made of permeable materials.

4. The linear motor according to claim 1, wherein each of the first magnetic yoke is a second magnet.

5. The linear motor according to claim 4, wherein each the second magnet and at least one of the first magnets are integrally formed and integrated as a third magnet.

6. A motor set, comprising:
   a plurality of first magnetic yokes;
   a plurality of linear motors, wherein each of the linear motors is partially disposed between two adjacent first magnetic yokes of the first magnetic yokes, and each of the linear motors comprises:
   a case disposed along a first direction;
   a magnet assembly comprising at least two first magnets, wherein the first magnets are disposed corresponding to and between the two adjacent first magnetic yokes, respectively; and
   a coil assembly comprising a winding coil, wherein the winding coil has an exposed portion, the exposed portion is extended along a second direction from the case and at least partially disposed between the two adjacent first magnetic yokes, and the exposed portion is at least partially overlapped with the first magnets in a third direction, such that the coil assembly and the case are driven to reciprocate along the first direction by the winding coil due to the magnetic force; and two sets of two first magnetic yokes wherein two second magnetic yokes are disposed on the two opposite sides of the first magnetic yokes and connected to two other first yokes disposed on the two opposite sides of the first magnetic yokes, respectively;

wherein the case comprises a first body, a second body and at least a connecting portion, wherein the first body is disposed along the first direction and the second body is parallel to the first body, the exposed portion of the winding coil of the coil assembly is extended from the first body, and the connecting portion is perpendicular to and connected with the first body and the second body, and wherein the amount of the first magnetic yokes is equal to the amount of the cases plus one.

7. The motor set according to claim 6, wherein each of the first magnetic yoke is a second magnet.

8. The motor set according to claim 7, wherein each the second magnet and two adjacent first magnets of the first magnets of the magnet assembly of the linear motor are integrally formed and integrated as a third magnet.

9. The motor set according to claim 6, wherein the two second magnetic yokes are made of permeable materials.

10. The motor set according to claim 6 further comprising:
a motion-guiding device disposed on the second body of the case, comprising:
a main body having at least a sliding rail; and
at least a sliding member connected with the main body and the second body of the case for supporting the main body; and
a linear position-sensing device comprising:
a sensing unit disposed on a fixing mechanism; and
a linear scale disposed on the second body of the case;
wherein the relative motions between the sensing unit and the linear scale are sensed by the sensing unit for linear position-sensing.

* * * * *